(12) United States Patent
Smith et al.

(10) Patent No.: US 6,746,375 B2
(45) Date of Patent: Jun. 8, 2004

(54) HYDROTHERAPY APPARATUS

(76) Inventors: Bradley Russell Smith, Malt House, Malt House Lane, Gissing, Diss, Norfolk (GB), IP22 5UT; Catherine Elizabeth Smith, Malt House, Malt House Lane, Gissing, Diss, Norfolk (GB), IP22 5UT ( * ) Notice: Subject to any disclaimer, the term of this patent is extended or adjusted under 35 U.S.C. 154(b) by 181 days.

(21) Appl. No.: 10/153,020

(22) Filed: May 21, 2002

(65) Prior Publication Data

US 2002/0177794 A1 Nov. 28, 2002

(30) Foreign Application Priority Data

May 23, 2001 (GB) .............................. 0112526

(51) Int. Cl.⁷ .............................. A63B 22/00
(52) U.S. Cl. .............................. 482/54; 482/51; 119/700
(58) Field of Search .................... 482/51, 54; 119/700; 4/488, 489

(56) References Cited

U.S. PATENT DOCUMENTS

| | | | | |
|---|---|---|---|---|
| 4,776,581 A | * | 10/1988 | Shepherdson | 482/27 |
| 5,108,088 A | * | 4/1992 | Keller et al. | 482/5 |
| 5,379,467 A | * | 1/1995 | Lochbaum | 4/489 |

* cited by examiner

*Primary Examiner*—Glenn E. Richman
(74) *Attorney, Agent, or Firm*—Barnes & Thornburg LLP

(57) ABSTRACT

Hydrotherapy apparatus is described comprising a tank for containing water and having a moving belt above the tank floor for the user to walk upon, the tank having a door which when raised seals the tank and when lowered forms a ramp to enable the user to enter the tank onto the belt.

6 Claims, 4 Drawing Sheets

HYDROTHERAPY APPARATUS

FIELD OF THE INVENTION

This invention relates to hydrotherapy apparatus. The apparatus may be designed so as to be suitable for animals such as dogs or may be designed to be suitable for use by humans.

SUMMARY OF THE INVENTION

According to one aspect of the invention there is provided hydrotherapy apparatus comprising a tank for containing water, the tank having over its floor a belt having a supporting surface to be walked upon, the supporting surface being driveable in the direction of the length of the tank, which has at one end a drop down door which in its raised, closed condition seals the one end of the tank and in its lowered, open position serves as a ramp up which a person or animal can walk into the tank, and means for filling the tank with water up to a selected level when the door is closed.

According to another aspect of the invention there is provided hydrotherapy apparatus comprising a tank for containing water, the tank having over its floor a belt having a supporting surface to be walked upon, the supporting surface being driveable unidirectionally, the belt and its associated driving means being displaceable to a raised position to enable the tank, including the floor thereof, to be cleaned, and means for filling the tank with water up to a selected level.

According to still another aspect of the invention there is provided hydrotherapy apparatus comprising a tank for containing water, the tank having over its floor a belt having a supporting surface to be walked upon, the supporting surface being driveable unidirectionally, the apparatus also comprising a separate storage tank for holding water to be used for pumped transfer of water into and out of the hydrotherapy tank.

In use, the hydrotherapy tank is intended to be entered and the belt drive started so that an animal or human can walk against the direction of movement of the supporting surface, effectively to remain stationary. The effort required to counter the movement of the supporting surface can be varied by filling the tank with water up to a selected level, so that either only the lower parts, or alternatively more, or even the whole of the legs will be submerged and will have to be moved through the water. It is also obvious that the hydrotherapy tank can be used dry.

The water fed into the tank is preferably pre-heated to a convenient temperature, typically near blood temperature.

Water is preferably fed into and out of the hydrotherapy tank through the tank floor beneath the belt, so as to minimise disturbance or distraction to the tank user. The belt, however, is preferably perforated to ease passage of water into and out of the hydrotherapy tank and also to assist in lubrication of the belt.

It is another feature of the invention that, below the belt, the floor is sloped to a water exit point, conveniently at the centre of the floor.

The belt may be a continuously driven belt with upper and lower runs, the upper run being supported by a stationary plate. The plate may be upturned at its side edges to assist in guiding the belt.

Alternatively or additionally the upper run belt may be guided along its longitudinal centre, as by a rib running in a groove in the supporting plate.

The belt tension is preferably adjustable.

When the belt and its driving means is raisable out of the way to facilitate cleaning, the guide means will be raisable with the belt. A preferred means of raising the belt assembly to facilitate cleaning is to swing the assembly upwards about a pivotal mounting at one end of the hydrotherapy tank.

At least one side of the hydrotherapy tank may be transparent to enable a supervisor to watch the movements of the user.

The hydrotherapy tank is preferably made of stainless steel, except for the window or windows, and it may be fitted with wheels or castors having associated braking means.

The hydrotherapy tank may be tillable with water to such a level that the user can swim within the tank against a counter current induced in the water. This current may be induced by jetting water into the tank from one end, allowing a compensatory drainage to take place to maintain the water level substantially constant.

Clearly the hydrotherapy tank will be designed with dimensions to suit its intended use, e.g. by small animals, large animals, or humans.

The water storage tank, also preferably made of stainless steel, is preferably mounted on wheels or castors, so that it can be moved about, for example in an animal hospital, to serve a plurality of hydrotherapy tanks. To this end, the water storage tank may connect to the hydrotherapy tank via flexible hoses when water is to be transferred into or out of the hydrotherapy tank. Suitable braking means is provided for the wheels or castors.

The water storage tank preferably includes a housing for three pumps, one for pumping water into the hydrotherapy tank, one for pumping water out of the hydrotherapy tank, and one for circulating water within the water storage tank. Water within the storage tank is preferably re-circulated via a filter, which may be a sand filter, and a heater which pre-heats the water to be used in the hydrotherapy tank.

The water storage tank may also incorporate a chlorinator and/or ozonator.

A reversing valve associated with the recirculation pump enables backwashing, e.g. to clean the filter.

All valving incorporated into the water storage tank may be electrically operated. For ease of operation of the pumps and valving in the water storage tank a control panel is provided conveniently on the housing for the pumps.

DESCRIPTION OF EMBODIMENT

The invention is further described with reference to the accompanying diagrammatic drawings, in which.

Figure 1:
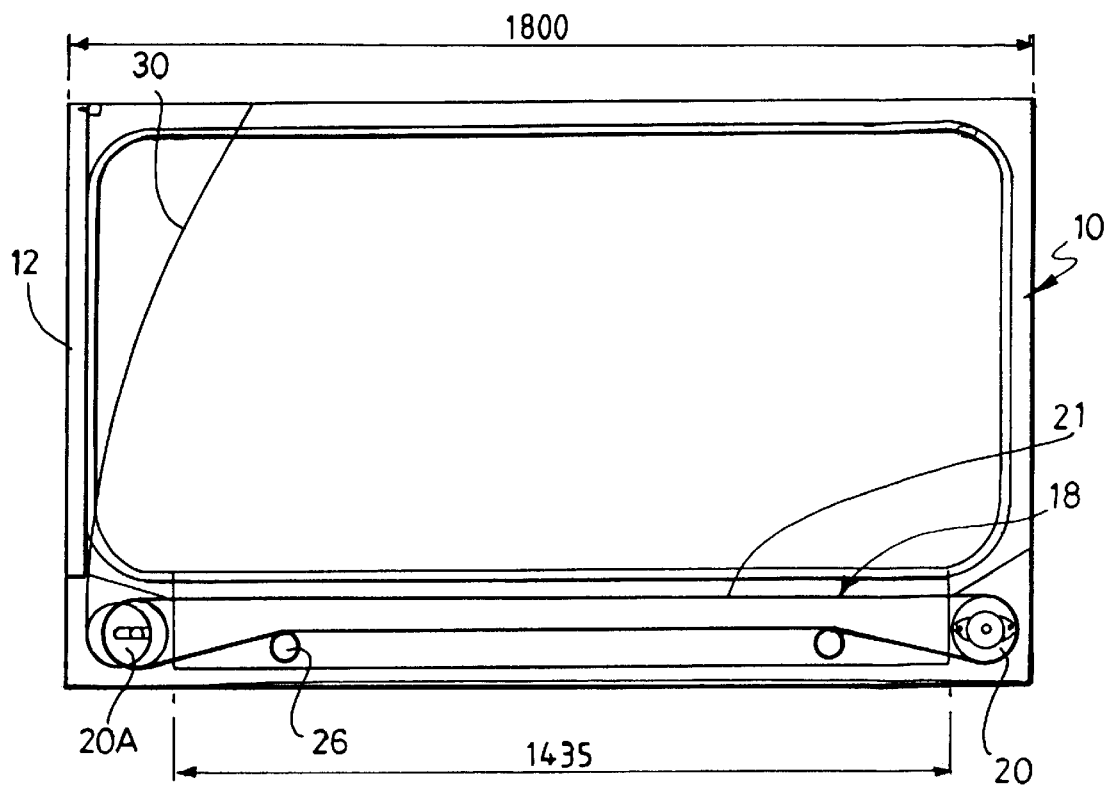
FIG. 1 shows one embodiment of hydrotherapy tank diagrammatically in side view.
Figure 2:
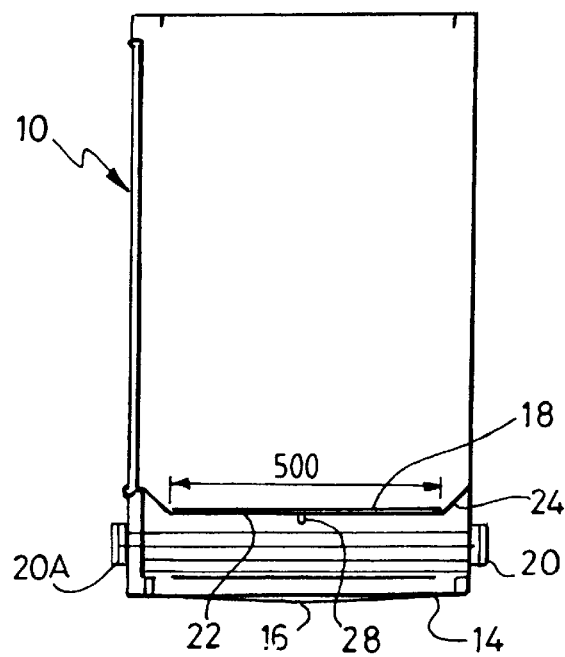
FIG. 2 shows the tank diagrammatically in end view.

In FIG. 1 dimensions in mm are marked on the illustrated hydrotherapy tank 10, which is intended for use by an animal such as a dog, but in general the tank will be dimensioned to suit the size of the intended user, animal or human.

The tank 10, preferably made of stainless steel except for one transparent sidewall, has at one end a drop down door 12, which in its lowered open position forms a ramp up which the user can walk into the tank. In its raised closed position, the door seals the tank watertight.

Above its floor 14, which slopes to a centre drainage point 16, an endless belt 18 is mounted between shafts 20, 20A, one driveable so that the upper run 21 of the belt which constitutes a supporting surface for the user, can be continuously driven from one end of the tank towards the other end. A stationary supporting plate 22 with upwardly sloped side edges 24 underlies the upper run of the belt, which can be correctly tensioned by means of the shaft 20A and the rollers 26 acting on the lower run. The underside of the upper run has a rib 28, which runs in a guide groove (not visible) in the supporting plate.

As indicated by the line 30 in FIG. 1, the complete belt, together with its supporting plate and relevant parts of the belt drive, can be swung into a raised position, to enable the floor of the tank, which at its central drainage point may include a filtering device, to be cleaned and maintained.

Although not shown, the tank has an inlet for heated water above the floor, enabling the tank to be filled to a chosen level. It is also possible, in the fixed end wall of the tank, to provide water jets usable to induce a current in the water, when the tank is filled to a suitably high level, to enable the user to swim against the current.

In use, the user enters the tank via the ramp. The door is then closed and the belt set in motion. The user then walks to maintain a stationary position within the tank. Water can be added, to any chosen level, to increase the effort required of the user to maintain position.

Figure 3:
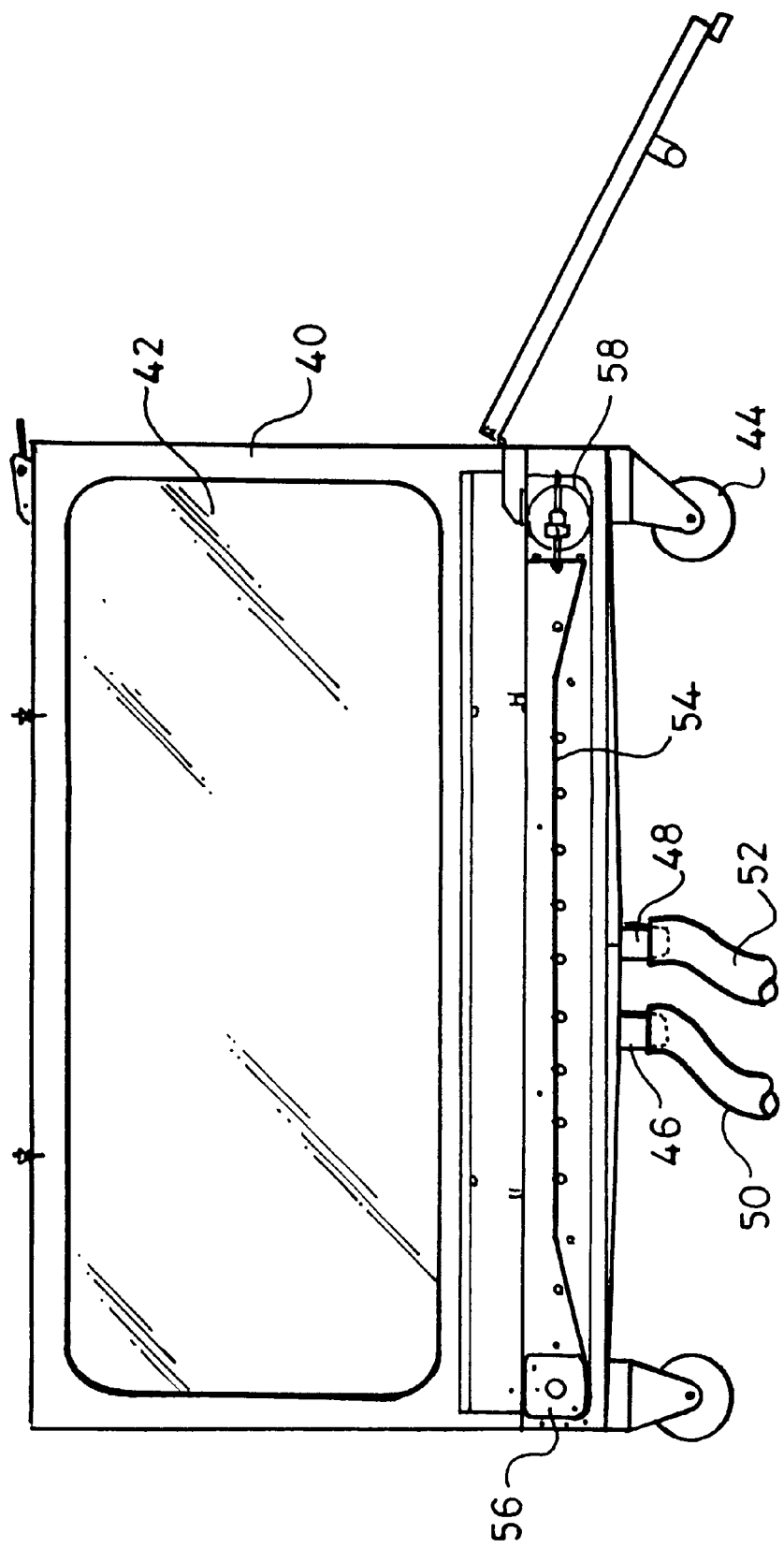
FIG. 3 shows a hydrotherapy tank having minor modifications from the tank shown in FIG. 1.
Figure 4:
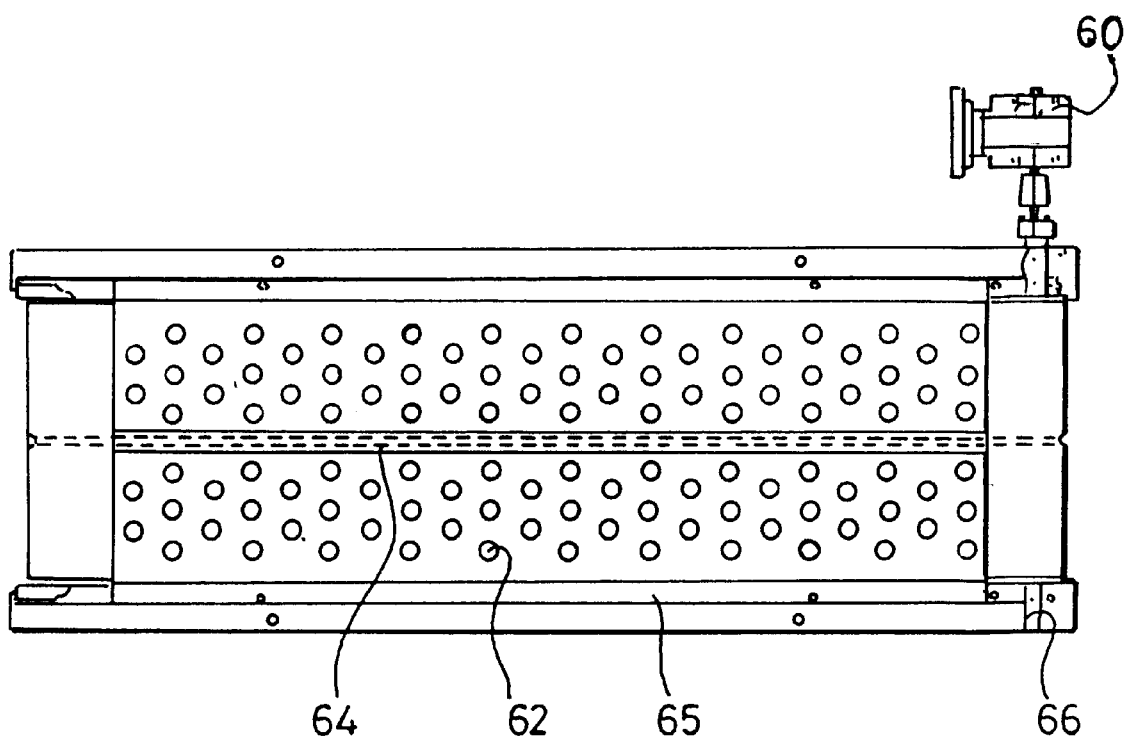
FIG. 4 is a plan view of the conveyor in the modified tank.

A preferred hydrotherapy tank is shown in FIG. 3, and a preferred belt mounted therein in FIG. 4.

As in FIG. 1, the tank 40 in FIG. 3 is made of stainless steel, with a window 42 at least in one side. A top hinged door 41 seals the tank closed in its raised position, and serves as a walkway ramp into the tank in its lowered position. The tank is supported on wheels 44, preferably having associated braking means (not shown).

Water can be pumped into and out of the tank 40 through entry and exit ports 46, 48 in the floor of the tank, to which ports can be connected flexible hoses 50, 52 connecting to a water storage tank later described with reference to FIG. 5.

Above the floor of the tank is mounted an endless belt 54 (see also FIG. 4) running around end rollers 56, 58 and driveable at a variable selected speed by an electric motor 60. The belt is perforated, as indicated at 62, so that entry and exit of water, which takes place beneath the belt, does not unduly disturb a tank user, typically a dog in the present case. Moreover, the belt is guided by suitable guide means 64, more especially a rib running in a groove in a fixed supporting means 65, along its longitudinal centre line.

For the purpose of enabling the tank, especially the floor, to be cleaned, the complete belt assembly can be swung upwards about a pivot rod 66 at one end of the tank.

The water storage tank 70 enabling the above-described hydrotherapy tank to be filled or emptied of water is shown in FIG. 5. The drawing shows the storage tank principally without its interior parts and fittings, to which access can be gained by means of a removable cover 72.

The storage tank 70 has wheels 74 to facilitate movement around an animal hospital, and retractable stands 76 for stably supporting the tank in an appropriate position, e.g. near a hydrotherapy tank.

Figure 5A:
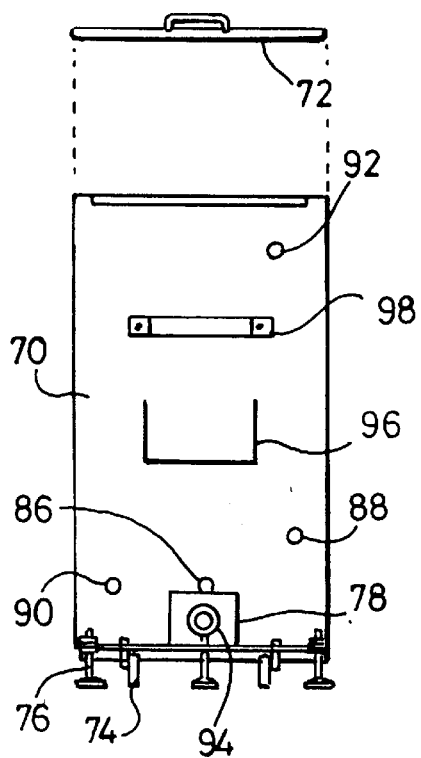
FIGS. 5a to 5d are respectively an end elevational view, side elevational view, plan view and detail of a water storage tank.
Figure 5B:
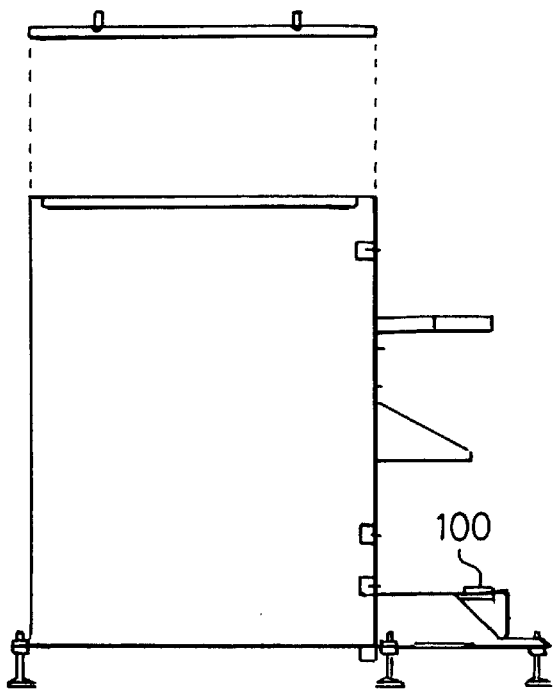
Figure 5C:
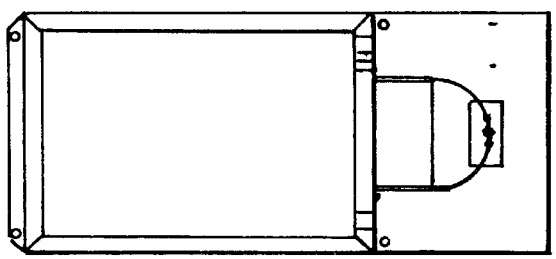
Figure 5D:
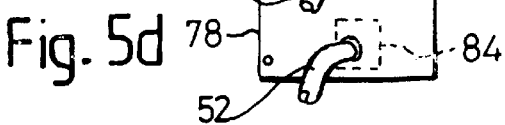

At one end, the tank 70 is fitted on one side with a housing 78 for containing three pumps 80, 82, and 84, shown in dotted line in FIG. 5d, respectively to be switched on for transfer of water form the storage tank into the hydrotherapy tank, for the reverse procedure, and for circulating water within the storage tank. In FIG. 5a, port 86 in the main tank wall communicates with the pump for feeding water into the hydrotherapy tank, port 88 with the pump for extracting water from the hydrotherapy tank, and ports 90 and 92 with the pump for recirculating water within the storage tank via a water heater which mounts into fitting 94, a sand filter 98 which mounts into tray 96 and is secured by strap 98, and the body of water within the tank. Also incorporated into the path of water recirculation may be a chlorinator and an ozonator, such as a floating ozonator.

Water passing through two of the pumps is fed to or drawn from the hydrotherapy tank through the above-mentioned flexible hoses 50, 52, which at the storage tank connect to the respective pumps. Associated with the third pump, the recirculation pump, is a reversing valve 102 enabling the filter etc., to be backwashed to drainage. The pump for feeding water into the hydrotherapy tank may include a hair trap (not shown), or this may be positioned in the water recirculation path.

The pump housing 78 also carries a control panel 100 with switches, speed controllers, etc., by means of which the complete apparatus can be operated and controlled.

What is claimed is:

1. Hydrotherapy apparatus comprising a tank for containing water, a drop down door at one end of the tank which in a raised, closed condition seals the said one end of the tank and in a lowered, open position serves as a ramp up which a person or animal can walk into the tank, means for filling the tank with water up to a selected level when the door is closed, an endless belt part of which extends over the floor of the tank and provides a supporting surface to be walked upon, and means for driving the belt so that the supportive surface moves towards or away from the said one end of the tank.

2. Hydrotherapy apparatus according to claim 1, wherein water is fed into and out of the tank through the floor beneath the belt.

3. Hydrotherapy apparatus according to claim 1, wherein the belt is perforated.

4. Hydrotherapy apparatus according to claim 1, wherein the belt is continuously driven with upper and lower runs passing around end rollers, at least the upper run being supported by a plate along which movement of the belt is guided.

5. Hydrotherapy apparatus according to claim 1 wherein at least the belt when inoperative, is upwardly displaceable in order to facilitate cleaning of the tank floor.

6. Hydrotherapy apparatus according to claim 5 wherein the belt is upwardly swingable about a pivot.

* * * * *